United States Patent [19]
Birch et al.

[11] Patent Number: 5,763,776
[45] Date of Patent: Jun. 9, 1998

[54] SELF-SEALING SIGHT GLASS FOR A FLUID VESSEL

[75] Inventors: G. Pat Birch, Turnersville, N.J.; Stephen Showalter, Milmont Park, Pa.

[73] Assignee: Vickers, Inc., Maumee, Ohio

[21] Appl. No.: 603,452

[22] Filed: Feb. 20, 1996

[51] Int. Cl.⁶ ................................................ G01F 23/02
[52] U.S. Cl. ........................... 73/323; 73/332; 116/216; 116/217; 116/227
[58] Field of Search ..................... 73/323, 332, 333; 116/207, 212, 216, 217, 276, 227; 137/468, 72, 75, 71; 236/93 R

[56] References Cited

U.S. PATENT DOCUMENTS

| | | | |
|---|---|---|---|
| 1,072,642 | 9/1913 | Pap | 73/333 |
| 1,087,821 | 2/1914 | Pettus | 73/333 |
| 1,515,461 | 11/1924 | Dallas et al. | 73/333 |
| 1,598,889 | 9/1926 | Stephens | 73/333 |
| 1,626,223 | 4/1927 | Burlingham | 73/333 |
| 1,782,760 | 11/1930 | Lovekin | 137/75 |
| 2,301,014 | 11/1942 | Burklin | 137/75 |
| 2,434,393 | 1/1948 | Chace et al. | 236/93 R |
| 2,607,226 | 8/1952 | Biscoe | 73/333 |
| 3,817,353 | 6/1974 | Mills | 137/75 |

*Primary Examiner*—Thomas B. Will
*Assistant Examiner*—Andrew Hirshfeld
*Attorney, Agent, or Firm*—Barnes, Kisselle, Raisch, Choate, Whittemore & Hulbert, P.C.

[57] ABSTRACT

A sight glass for a fluid vessel that includes a housing with facility for mounting to a fluid vessel wall, and a transparent window mounted within the housing for viewing fluid within the vessel from outside of the vessel wall. A valve mounted within the housing has a normally open position for permitting passage of fluid from within the vessel to adjacent the window, and a closed position for blocking such fluid passage. The valve includes structure responsive to one or more predetermined conditions at the sight glass for moving the valve to the closed position so as to block passage of fluid to the window, and thereby provide a visual indication of occurrence of the predetermined conditions from outside of the vessel. The predetermined condition(s) sensed by the sight glass in the various embodiments of the invention include fluid leakage at the side glass, cracking or rupture of the viewing window, a high temperature or pressure condition within the vessel, and/or a high temperature condition outside of the vessel.

22 Claims, 3 Drawing Sheets

SELF-SEALING SIGHT GLASS FOR A FLUID VESSEL

The present invention is directed to sight glasses for observing fluids within a vessel, and more particularly to a self-sealing sight glass for indicating a predetermined condition within the vessel.

BACKGROUND AND SUMMARY OF THE INVENTION

Sight glasses are conventionally employed for observing fluids within fluid vessels in fuel systems, air-conditioning systems, aircraft and industrial oil/lubricant reservoirs, hazardous/toxic/corrosive chemical vessels, agricultural chemical tanks/dispensers and like applications. One conventional type of sight glass includes a generally cylindrical housing having external threads for removable receipt within an internally threaded opening in the sidewall of the vessel, and a transparent window carried within the housing for visual observation of fluid within the vessel. A sight glass of this character can be employed for observing fluid level, fluid color or other visual condition.

It is a general object of the present invention to provide a sight glass of the described character that includes facility for automatically indicating to an observer one or more predetermined alarm conditions associated with the fluid, the vessel or the sight glass. A more specific object of the present invention is to provide a sight glass of the described character that includes facility for automatically detecting and indicating to an observer a leakage condition at the sight glass, a high-temperature condition within or external to the vessel, and/or a high pressure condition within the fluid vessel.

A sight glass for a fluid vessel in accordance with the presently preferred embodiments of the invention includes a housing with facility for mounting to a fluid vessel wall, and a transparent window mounted within the housing for viewing fluid within the vessel from outside of the vessel wall. A valve mounted within the housing has a normally open position for permitting passage of fluid from within the vessel to adjacent the window for external observation, and a closed position for blocking such fluid passage. The valve includes structure responsive to a predetermined condition at the sight glass for moving the valve to the closed position so as to block passage of fluid to the window, and thereby providing a visual indication of occurrence of the predetermined condition from outside of the vessel. The predetermined conditions sensed by the sight glass in the various embodiments of the invention include fluid leakage at the sight glass, cracking or rupture of the viewing window and/or a high temperature or high pressure condition within the vessel, and/or a high temperature condition outside of the vessel.

The valve in the preferred embodiments of the invention includes a passage within the sight glass housing for admitting fluid from within the vessel, and a valve element disposed to close such passage upon occurrence of the predetermined condition or conditions sensed by the sight glass. The passage surrounds the valve element and has a valve seat. The valve further includes structure for urging the valve element against the seat upon occurrence of the predetermined condition(s) sensed by the sight glass to block passage of fluid to the sight glass window. In some embodiments of the invention, the valve element is urged to the closed position by a spring carried by the sight glass. In another embodiment of the invention, a vacuum chamber is formed within the sight glass and coupled to the valve element in such a way that loss of vacuum within the vacuum chamber urges the valve element against the valve seat.

In some embodiments of the invention, a pair of windows are spaced from each other within the sight glass housing so as to form a sealed chamber between the windows. The valve is responsive to loss of seal at this chamber for closing the valve. The chamber in various embodiments is coupled to the atmosphere outside of the vessel by a passage that extends from the chamber, and a plug normally closes this passage. The plug is constructed of material, such as welders wax, that melts at a predetermined temperature above ambient temperature for unplugging the passage and thereby venting the chamber to atmosphere. Venting of the chamber to atmosphere through a cracked or broken window also closes the sight glass valve. In another embodiment of the invention, a plug of welders wax normally holds the valve element in the open condition in opposition to a valve spring, such that melting of the plug at a predetermined temperature within or outside of the vessel allows the spring to close the valve. The valve in various embodiments of the invention is also responsive to excessive pressure within the vessel for closing the valve and blocking fluid to the sight glass window.

BRIEF DESCRIPTION OF THE DRAWINGS

The invention, together with additional objects, features and advantages thereof, will be best understood from the following description, the appended claims, and the accompanying drawings in which:

DETAILED DESCRIPTION OF PREFERRED EMBODIMENTS

Figure 1:
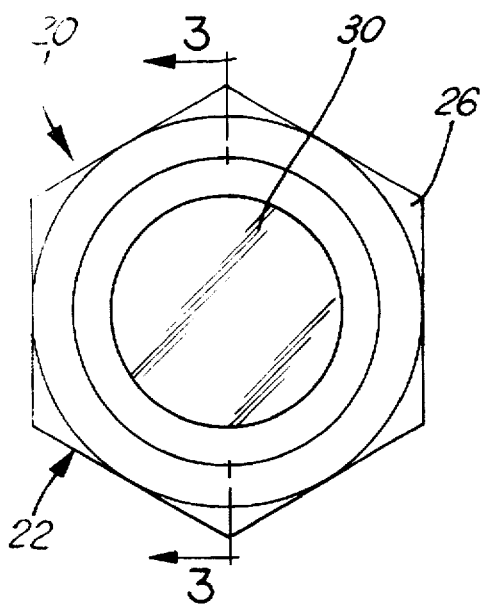
FIG. 1 is a front elevational view of a self-sealing sight glass in accordance with one presently preferred embodiment of the invention.
Figure 3:
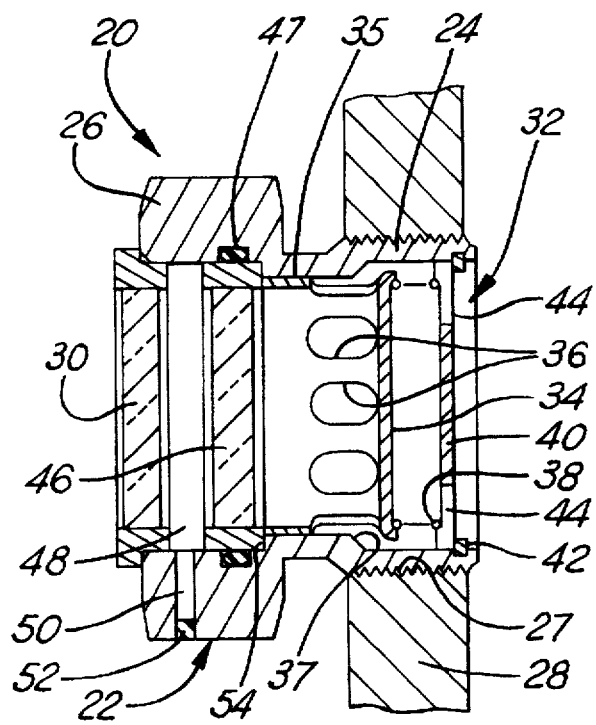
FIG. 3 is a sectional view taken substantially along the line 3—3 in FIG. 1 and showing the sight glass mounted to a vessel wall.
Figure 2:
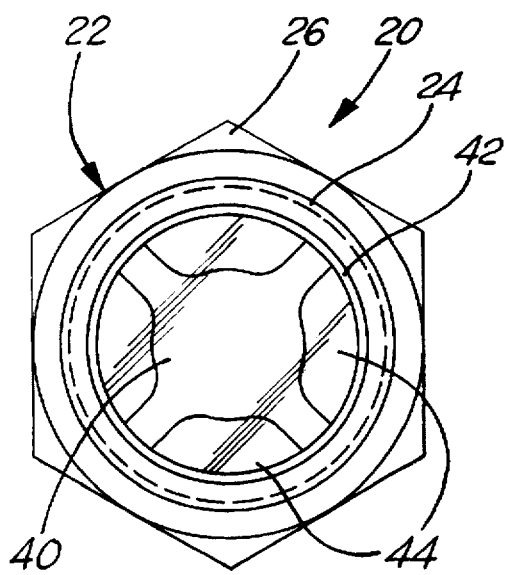
FIG. 2 is a rear elevational view of the sight glass illustrated in FIG. 1.
Figure 4:
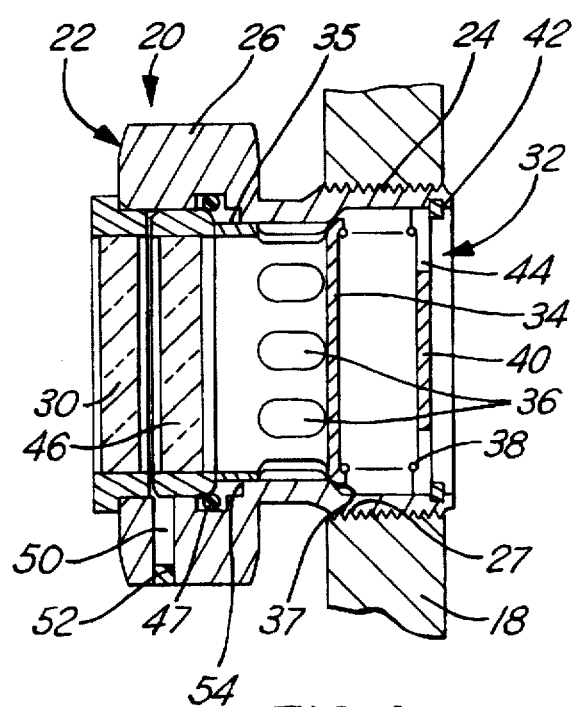
FIG. 4 is a sectional view similar to that of FIG. 3 but showing the sight glass in a closed condition.

FIGS. 1-4 illustrate a self-sealing sight glass 20 in accordance with one presently preferred embodiment of the invention as comprising a housing 22 having external threads 24 at one end and a hexagonal collar 26 at the opposing end for gripping by a wrench so as to thread housing 22 and sight glass 20 into an internally threaded opening 27 in the wall 28 of a fluid vessel. Housing 22 has an open interior. A window 30 of fused glass or other suitable material is welded or otherwise secured to housing 22 at the outer end of the housing passage. A fluid valve 32 is mounted within the housing passage so as to control flow of fluid through sight glass 20. Valve 32 includes a cup-shaped valve element 34 having a flange portion 35 with a peripheral array of fluid passages 36. A coil spring 38 is captured in compression between the inner end of valve element 34 and an end cap 40 that is captured within housing 22 by a retaining ring 42. (All directional adjectives such as "inner" and "outer" are taken with respect to the vessel interior.) The imperforate base of valve element 34 has a diameter sufficient to oppose a valve seat 37 in housing 22.

End cap 40 has a peripheral array of through-openings or apertures 44 through which fluid may flow from within the fluid vessel around the periphery of valve element 34 and through passages 36 to within the valve element. A second fused glass window 46 is disposed within housing 22 and slidably engages the surrounding wall of the housing passage. Window 46 is sealed with respect to the housing passage by an O-Ring 47 in the housing passage wall that surrounds the periphery window 46. There is thus formed a flat circular chamber 48 between windows 30, 46. A passage 50 extends radially through housing collar 26 from chamber 48, and a plug 52 normally closes the outer end of passage 50 so as to seal chamber 48 from the atmosphere outside of the vessel surrounding sight glass 20. Window 46 is welded or otherwise secured to the outer end portion 35 of valve element 34 so as to move conjointly with the valve element.

As initially manufactured, chamber 48 is pressurized with a suitable gas, such as nitrogen, to an internal pressure sufficient to overcome the pressure to coil spring 38 and the internal pressure of fluid within vessel wall 28. Thus, valve element 34 is normally urged to the open position illustrated in FIG. 3 by the pressure of gas within chamber 48 between windows 30, 46. In this valve position, window 46 rests against an opposing internal shoulder 54 in housing 22, and the periphery of valve element 34 is spaced from valve seat 37. Fluid within vessel wall 28 may freely flow through apertures 44 in end cap 40, around the base of valve element 34 past valve seat 37, through passages 36 in valve element flange 35 to adjacent window 46 for visual observation from outside of the vessel. Any condition that causes valve element 34 to move to the left in FIG. 3—i.e., to the position of FIG. 4—brings the base of valve element 34 into engagement with valve seat 37 so as to block flow of fluid through passages 36. Such motion of valve element 34 from the open position of FIG. 3 to the closed position of FIG. 4 can be caused by a loss of gas pressure within chamber 48 due to rupture or cracking of window 30 or 46, or due to melting of plug 52. The latter may occur when the temperature within or outside of vessel wall 28 causes conduction of sufficient heat from the vessel wall through housing 22 to plug 52 so as to melt the plug. Plug 52 may be formed of any suitable temperature-responsive material, such as welders wax. Valve element 34 may also be caused to move from the open position of FIG. 3 to the closed position of FIG. 4 by excessive pressure of fluid within vessel wall 28, which cooperates with the pressure applied by spring 38 to move valve element 34 to the closed condition against the force of gas pressure between windows 30, 46. Thus, fluid is blocked from observation windows 30, 46 in the sight glass embodiment of FIGS. 1–4 due to excessive temperature within the fluid vessel, failure at either window 30, 46, or excessive pressure within the fluid vessel.

FIGS. 5–10 illustrate various alternative or modified embodiments of the invention. Identical reference numerals are employed in the drawings to illustrate identical parts or components among the various embodiments, and reference numerals followed by a suffix are employed to illustrate modified elements or components.

Figure 5:
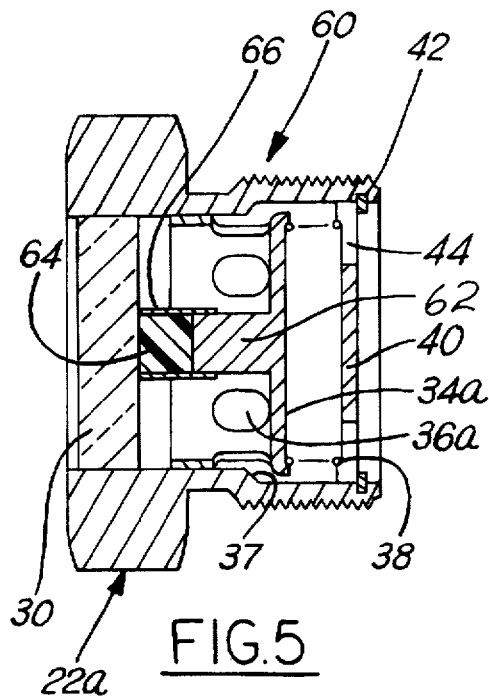
FIGS. 5 and 6 are sectional views similar to those of FIGS. 3 and 4 but showing a modified embodiment of the invention in the open end closed conditions respectively.
Figure 6:
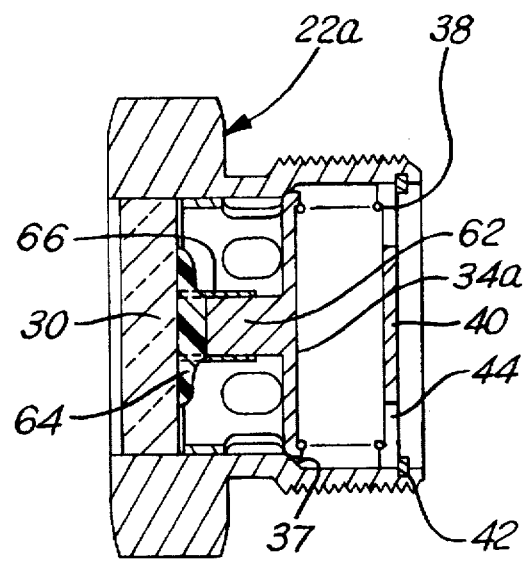

FIGS. 5 and 6 illustrate a modified sight glass 60 that is responsive solely to excess temperature within the fluid vessel due to overheating or combustion of the fluid, for example. Valve element 34a in sight glass 60 includes a central stem 62 that extends axially toward window 30. A plug 64 of temperature-responsive material such as welders wax is disposed between stem 62 and window 30, and is held in position by art apertured collar 66 that slidably surrounds stem 62. In the normally open position of FIG. 5, plug 64 spaces stem 62 and valve element 34a from window 30 sufficiently to allow passage of fluid past seat 37 to window 30. In the event of excessive fluid temperature, due to overheating or combustion of the fluid, for example, or in the event of excess external heat due to fire, for example, conducted through window 30, plug 64 melts and flows radially outwardly (FIG. 6) such that the periphery of valve element 34a is urged against seat 37 by coil spring 38, thereby blocking flow of fluid to viewing window 30.

Figure 7:
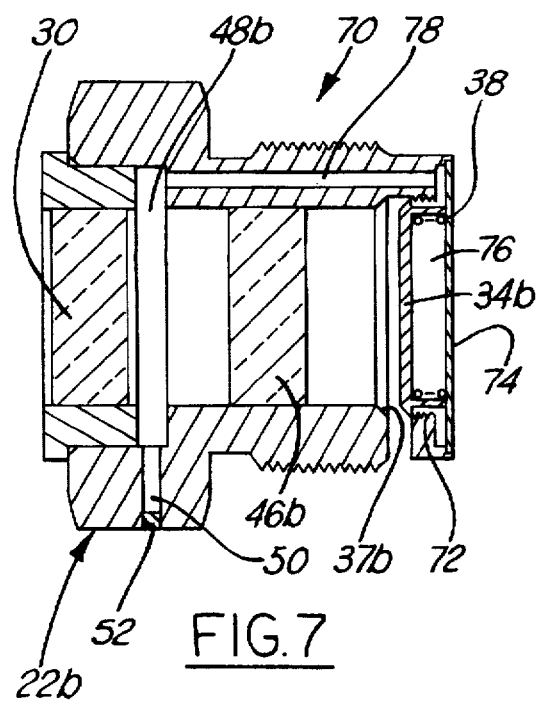
FIGS. 7 and 8 are sectional views similar to those of FIGS. 3 and 4 but showing a second modified embodiment of the invention in the opened and closed conditions respectively.
Figure 8:
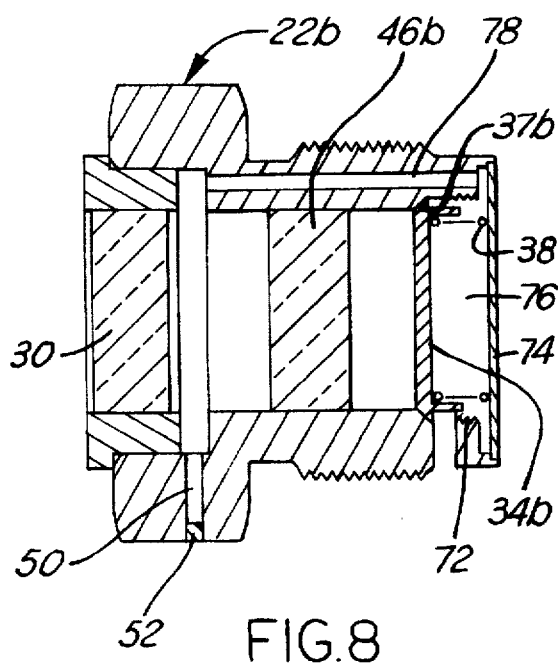

FIGS. 7 and 8 illustrate a sight glass 70 in which inner window 46b is fixedly positioned within housing 22b. Valve element 34b in this embodiment takes the form of a cup-shaped member that is mounted to the inner end of housing 22b by means of an axially extensible flexible diaphragm 72. An imperforate end plate 74 closes the inner end of housing 22b so as to form a pressure chamber in which coil spring 38 is disposed. Chamber 76 is connected to chamber 48b between windows 30, 46b by a passage 78 that extends axially through the outer wall of housing 22b. A segmented annular passage is formed between valve element 34b and housing valve seat 37b for admission of fluid to a position adjacent to window 46b when valve element 34b is in the normally open position illustrated in FIG. 7. In the embodiment of FIGS. 7 and 8, a vacuum (i.e., sub-atmospheric pressure) is applied to chamber 48b between windows 30, 46b, and through passage 78 to chamber 76 between plate 74 and valve element 34b. Venting of chambers 48b, 76 to atmosphere, due to melting of plug 52 or rupture at either window 30, 46b, allows coil spring 38 to move valve element 34b against seat 37b, as illustrated in FIG. 8, so as to block flow of fluid to the viewing windows.

Figure 9:
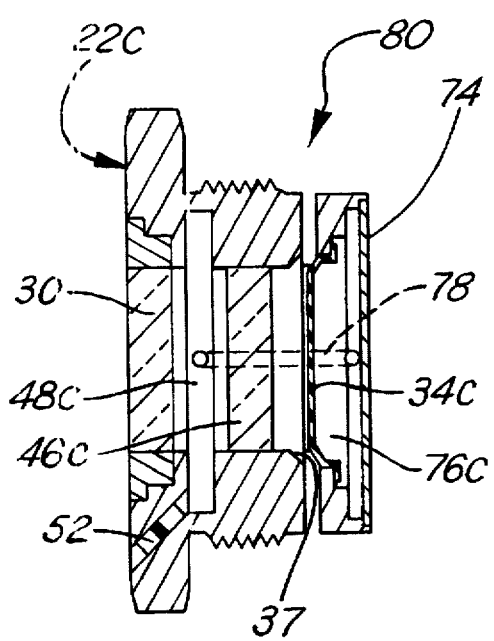
FIG. 9 is a sectional view similar to that of FIG. 3 showing yet another embodiment of the invention.

FIG. 9 illustrates a self-sealing sight glass 80 that is similar to sight glass 70 of FIGS. 7 and 8, except that no coil spring is disposed between valve element 34c and end plate 74. In this embodiment, a vacuum applied to chamber 48c between windows 30, 46c is also applied to chamber 76c by passage 78. Thus, valve element 34c is held away from valve seat 37 by the vacuum within chamber 76c. Upon occurrence of excessive temperature sufficient to melt plug 52, or rupture or cracking at either window 30, 46c, loss of chamber vacuum by venting the chambers to atmosphere allows valve element 34c to move against seat 37 and block flow of fluid to window 46c.

Figure 10:
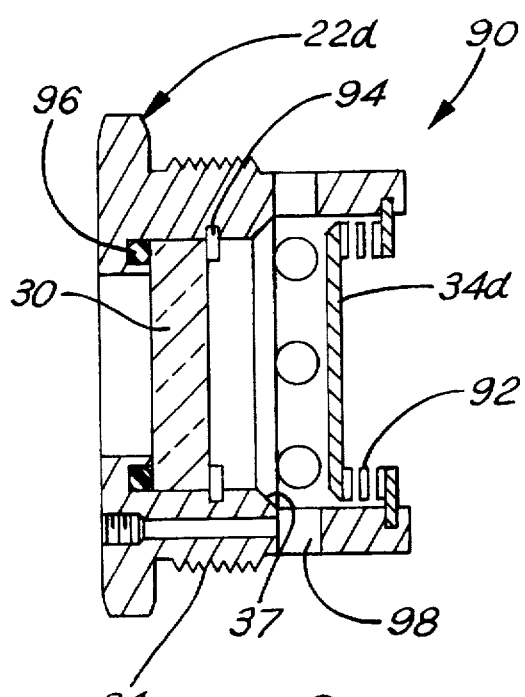
FIG. 10 is a sectional view similar to that of FIG. 3 showing a further embodiment of the invention.

FIG. 10 illustrates a self-sealing sight glass 90, in which valve element 34d takes the form of a flat circular disk normally held out of engagement with seat 37 by a temperature-responsive spring element 92 that effectively suspends valve element 34d within housing 22d. Window 30 is held in position by a retaining ring 94 against an O-ring seal 96 at the outer end of housing 22d. In the event that temperature within the fluid vessel reaches an excessive level, due to overheating or combustion of the fluid for example, temperature-responsive spring 92 urges valve element 34d against seat 37 within housing 22d, thereby blocking flow of fluid through housing passages 98 to a position adjacent to the window.

There have thus been disclosed several embodiments of the present invention, each of which satisfies some or all of the objects and aims previously set forth. All embodiments of the invention are responsive to excessive temperature within or outside of the fluid vessel, due to overheating or combustion for example, for closing the sight glass valve and blocking flow of fluid to the observation window. Various embodiments are also additionally responsive to cracking or fracture at the sight glass window for blocking fluid flow and/or excessive pressure of fluid within the fluid vessel. Thus, in response to some or all of these alarm conditions, flow of fluid to the observation window is blocked, providing a visual indication of the alarm condition to an observer outside of the fluid vessel.

We claim:

1. A sight glass for a fluid vessel that comprises:

a housing having an open interior, axially spaced opposed open ends, means at one end of said housing for mounting said housing to a single opening in a fluid vessel wall such that fluid from the vessel may flow into said housing interior through the single opening, and a valve seat around said open interior spaced from and opposed to said one open end, transparent window means mounted to said housing so as to close the other end of said housing spaced from said one end, and valve means within said housing adjacent to said one end between said one end and said valve seat, said valve means including a valve element having a normally open position spaced from said valve seat for permitting passage of fluid from within the vessel through said single opening into the housing interior and a closed position against said seat for blocking such fluid passage, said valve means including means mounted within said housing and responsive to a predetermined condition at said sight glass for urging said valve element, independent of fluid within the vessel, to said closed position against said seat to block passage of fluid to said window means and thereby provide a vessel indicative of said condition from outside of the vessel.

2. The sight glass set forth in claim 1 wherein said element-urging means includes a spring captured between said valve element and spring keeper means within said housing at said one end of said housing.

3. The sight glass set forth in claim 2 wherein said spring is of temperature-responsive construction for urging said valve element against said seat when temperature within or outside of the vessel reaches a predetermined level.

4. The sight glass set forth in claim 1 wherein said element-urging means comprises means forming a chamber on a side of said valve element opposite said seat and means for sealing said chamber, said valve element being responsive to a loss of seal at said chamber for moving against said seat.

5. The sight glass set forth in claim 4 wherein said window means comprises a pair of window elements spaced from each other within said housing, means forming a second chamber between said window elements, and passage means connecting said second chamber to said chamber behind said valve element, such that said valve element is responsive to loss of seal at said chambers due to leakage at said window elements for closing said valve element against said seat.

6. The sight glass set forth in claim 5 further comprising a plug normally closing said second chamber, said plug being of a composition that melts at a predetermined temperature to vent said second chamber to atmosphere and thereby close said valve means.

7. The sight glass set forth in claim 1 wherein said window means comprise a pair of windows spaced from each other within said housing so as to form a sealed chamber between said windows said means responsive to said predetermined condition comprising means responsive to loss of seal at said chamber for closing said valve.

8. The sight glass set forth in claim 7 comprising a passage extending from said chamber and a plug normally closing said passage, said plug being of a composition that melts at a predetermined temperature to vent said chamber to atmosphere and thereby close said valve means.

9. The sight glass set forth in claim 7 wherein one of said windows is carried by said valve element.

10. The sight glass set forth in claim 7 wherein said valve means further includes a spring for closing said valve means upon loss of seal at said chamber.

11. The sight glass set forth in claim 1 wherein said condition-responsive means comprises means disposed within said housing responsive to temperature within or outside of the vessel for closing said valve means.

12. The sight glass set forth in claim 11 wherein said temperature-responsive means comprises a spring coupled to said valve means and responsive to temperature for closing said valve means.

13. The sight glass set forth in claim 11 wherein said temperature-responsive means comprises means forming a chamber within said housing, a passage leading from said chamber, a plug normally sealing said passage and being of a composition that melts at a predetermined temperature, and means responsive to loss of seal at said chamber to close said valve means.

14. The sight glass set forth in claim 11 wherein said valve means includes spring means urging said valve means to a closed position, and wherein said temperature-responsive means is coupled to said valve means for holding said valve means open against force of said spring until temperature reaches a preselected level.

15. The sight glass set forth in claim 1 wherein said condition-responsive means comprises means disposed within said housing and responsive to breakage or leakage at said window means.

16. The sight glass set forth in claim 15 wherein said window means comprises a pair of window elements mounted within said housing to form a sealed chamber therebetween, said condition-responsive means coupling said chamber to said valve means such that said valve means closes upon loss of seat at said chamber.

17. The sight glass set forth in claim 1 wherein said condition-responsive means comprises means responsive to over-pressure of fluid within the vessel.

18. The sight glass set forth in claim 1 wherein said means for mounting said housing comprises external threads for removable threaded mounting to the vessel wall.

19. A sight glass for a fluid vessel that comprises:

a housing including means for mounting to a fluid vessel wall, transparent window means mounted within said housing for viewing from outside the vessel wall, and valve means mounted within said housing and having a normally open position for permitting passage of fluid from within the vessel to said window means and a closed position blocking such passage, said valve means including means responsive to a predetermined condition at said sight glass for moving said valve means to said closed position to block passage of fluid to said window means and thereby provide a visual indication of said condition from outside of the vessel.

said valve means including passage means in said housing for admitting fluid from within the vessel and a valve element disposed to close said passage means upon occurrence of said predetermined condition, said passage means comprising a fluid passage surrounding said valve element and a valve seat in said fluid passage, said valve means further including means for urging said valve element against said seat upon occurrence of said predetermined condition to block passage of fluid to said window means, said element-urging means comprising means forming a chamber behind said valve element opposite said valve seat and means for sealing said chamber, said valve element being responsive to a loss of seal at said chamber for moving against said seat, said window means comprising a pair of window elements spaced from each other within said housing, means forming a second chamber between said window elements, and second passage means connecting said second chamber to said chamber behind said valve element, such that said valve element is responsive to loss of seal at said chambers due to leakage at said window elements for closing said valve element against said seat, and a plug normally closing said second chamber, said plug being of a composition that melts at a predetermined temperature to vent said second chamber to atmosphere and thereby close said valve means.

20. A sight glass for a fluid vessel that comprises:

a housing including means for mounting to a fluid vessel wall, transparent window means mounted within said housing for viewing from outside the vessel wall, and valve means mounted within said housing and having a normally open position for permitting passage of fluid from within the vessel to said window means and a closed position blocking such passage, said valve means including means responsive to a predetermined condition at said sight glass for moving said valve means to said closed position to block passage of fluid to said window means and thereby provide a visual indication of said condition from outside of the vessel, said window means comprising a pair of windows spaced from each other within said housing so as to form a sealed chamber between said windows, said means responsive to said predetermined condition comprising means responsive to loss of seal at said chamber for closing said valve, including a passage extending from said chamber and a plug normally closing said passage, said plug being of a composition that melts at a predetermined temperature to vent said chamber to atmosphere and thereby close said valve means.

21. A sight glass for a fluid vessel that comprises:

a housing including means for mounting to a fluid vessel wall, transparent window means mounted within said housing for viewing from outside the vessel wall, and valve means mounted within said housing and having a normally open position for permitting passage of fluid from within the vessel to said window means and a closed position blocking such passage, said valve means including means responsive to a predetermined condition at said sight glass for moving said valve means to said closed position to block passage of fluid to said window means and thereby provide a visual indication of said condition from outside of the vessel, said window means comprising a pair of windows spaced from each other within said housing so as to form a sealed chamber between said windows, said means responsive to said predetermined condition comprising means responsive to loss of seal at said chamber for closing said valve, with one of said windows being carried by said valve element.

22. A sight glass for a fluid vessel that comprises:

a housing including means for mounting to a fluid vessel wall, transparent window means mounted within said housing for viewing from outside the vessel wall, and valve means mounted within said housing and having a normally open position for permitting passage of fluid from within the vessel to said window means and a closed position blocking such passage, said valve means including means responsive to a predetermined condition at said sight glass for moving said valve means to said closed position to block passage of fluid to said window means and thereby provide a visual indication of said condition from outside of the vessel, said condition-responsive means comprising means responsive to temperature within or outside of the vessel for closing said valve means, said temperature-responsive means comprising means forming a chamber within said housing, a passage leading from said chamber, a plug normally sealing said passage and being of a composition that melts at a predetermined temperature, and means responsive to loss of seal at said chamber to close said valve means.

* * * * *